TEMPERATURE COMPENSATION OF OSCILLATORS AND THE LIKE

Filed June 9, 1966

INVENTOR
LAURICE J. WEST

BY Paris, Haskell & Levine
ATTORNEYS 3,388,344

TEMPERATURE COMPENSATION OF OSCILLATORS AND THE LIKE

Laurice J. West, Levittown, Pa., assignor to United Aircraft Corporation, a corporation of Delaware Filed June 9, 1966, Ser. No. 556,387
6 Claims. (Cl. 331—109)

ABSTRACT OF THE DISCLOSURE

A multiple range temperature compensation circuit for electronic circuitry experiencing nonlinear changes with temperature by automatically and sequentially switching plural approximately linear signal increments at different temperatures, with each increment being individually adjustable to closely simulate a small segment of nonlinear variation.

Figures 1, 2, 3, 4:
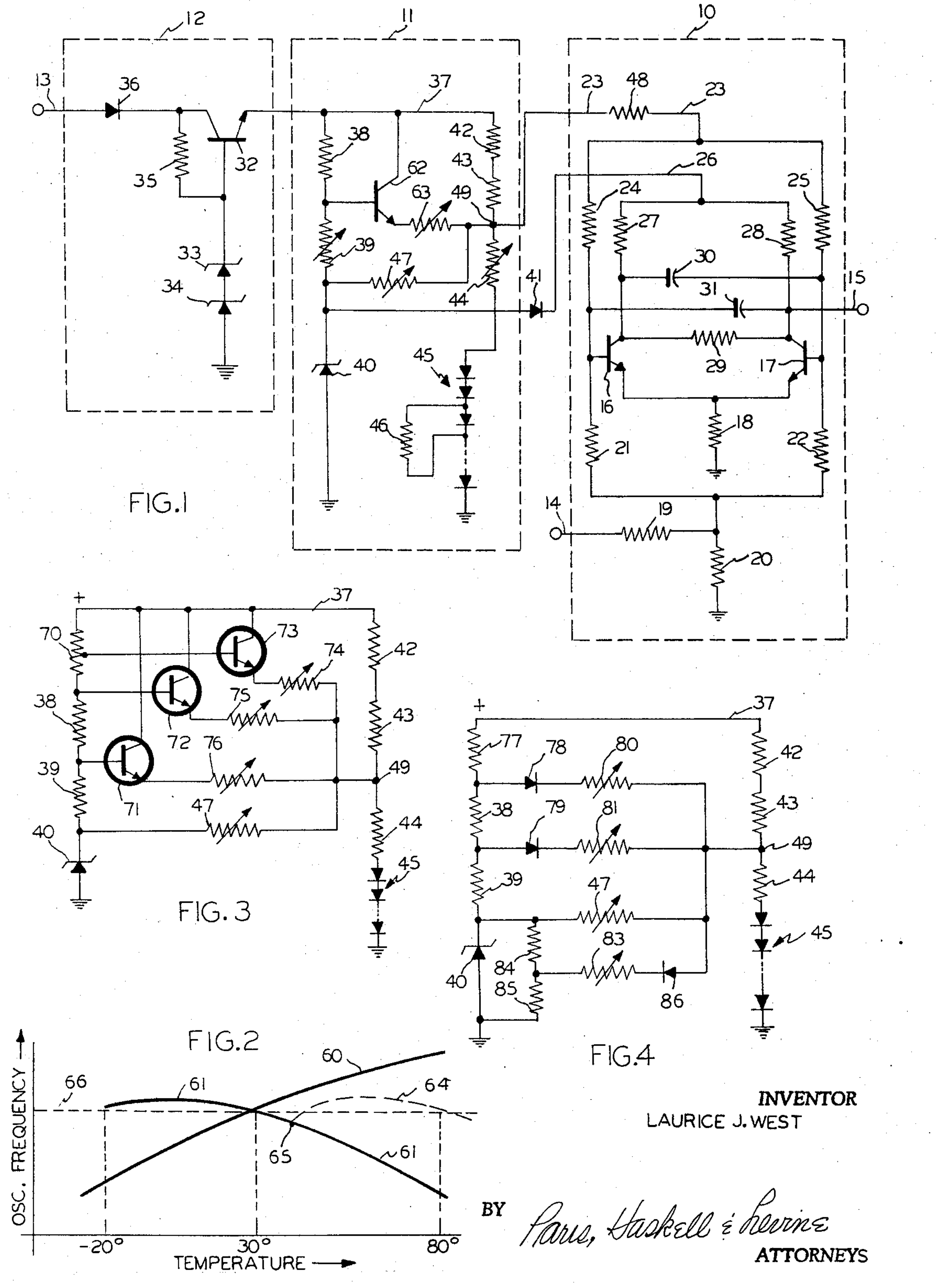

This invention generally relates to improvements in voltage controlled solid state multivibrator oscillators and to temperature compensation circuits for stabilizing such multivibrators over a wide range of temperatures as well as for use in compensating other electronic circuits experiencing nonlinear changes with temperature.

In many military and commercial applications, oscillators and other electronic circuits employing transistors and solid state devices are often subjected to wide variations in temperature that undesirably vary their operating characteristics. In the field of telemetering information between air and space vehicles and ground, for example, airborne electronic circuits are often subjected to temperature variations over ranges of 100° centigrade or greater, and the resulting changes in the circuits must be compensated over this wide range to maintain the communication circuits useful for their intended functions.

Heretofore such temperature compensation has been performed by empirically designing analog networks using thermistors and other temperature sensitive elements to vary with temperature in an essentially equal and opposite manner to the circuit being compensated, and such networks have been used to vary the bias or operating potentials of the oscillators or other circuits so as to maintain the circuitry operating properly at the different temperatures. However, since the temperature produced variations are most commonly nonlinear the design of such analog networks is necessarily produced by a trial and error process, and it is often quite laborious, difficult, and in many instances inadequate, to provide the desired compensation over a wide temperature range since the temperature induced changes in the circuit may involve nonlinearities of the first, second, and even higher orders at the different temperature regions within the wide range of temperatures experienced.

According to the present invention, there is provided a completely different approach to solving this problem that is not only easier to perform but provides far greater accuracies than can possibly be obtained by the conventional empirical temperature compensation network design. Very generally according to a preferred embodiment of the invention, the temperature compensation of solid state oscillators or other electronic circuits is obtained by preselecting different temperature regions within the complete range of temperature variations experienced wherein the changes produced in the circuit are essentially linear, and providing a different linear compensation means for each range. This, in effect, divides a nonlinear variation to be compensated into a series of interconnected linear segments, each of which can be easily approximated. The linear compensation means for each range of temperature are selectively interconnected into the circuit at the different temperatures by means of one or more solid state switches or diodes, or other switching means, and therefore become effective at the temperature regions desired. Since all nonlinear variations can be closely approximated by a series of straight lines of changing slope, the present invention enables almost all electronic circuits to be easily temperature compensated by the use of conventionally available linear components.

It is accordingly the principal object of the invention to provide an improved voltage controlled oscillator that is precisely temperature compensated over a range of 100° centigrade or greater.

A further object of the invention is to provide an improved temperature compensation system for electronic circuits experiencing nonlinear changes with temperature.

A still further object is to provide a multirange temperature compensation system for this purpose that sequentially applies linear corrections to the circuit at different temperature ranges to closely approximate and compensate for nonlinear variations.

Still another object is to provide such a temperature compensation system wherein it is not necessary to match the characteristics of nonlinear thermistors and other compensating elements with the nonlinear characteristics of the circuit being compensated.

Other objects and many additional advantages will be understood by those skilled in the art after a detailed consideration of the following specification taken with the accompanying drawings wherein:

FIG. 1 is an electrical schematic drawing showing one preferred embodiment of the invention, FIG. 2 is a chart illustrating the temperature compensation provided by the circuit of FIG. 1, and FIGS. 3 and 4 are schematic electrical diagrams illustrating alternative temperature compensation networks according to the invention.

Referring to the drawings, there is shown in FIG. 1 a preferred voltage controlled oscillator (VCO) system that may be constructed in microhybrid circuit form for such uses as aircraft telemetry systems or other where the system may be subjected to changes in ambient temperature over a range up to 100° centigrade or more.

As shown, the system includes a transistorized multivibrator stage within dotted enclosure 10, a temperature stabilization stage within dotted enclosure 11 for applying constant temperature stabilized bias voltages to the multivibrator over the complete range of temperatures experienced, and a voltage regulator stage within enclosure 12 for applying a regulated direct current supply voltage to the temperature stabilization stage 11.

For use in an FM/FM telemetry system, the VCO stage 10 is preferably of the type disclosed in Patent No. 3,246,258, assigned to the same assignee, that responds to the amplitude of an input signal over line 14 originating from a transducer or other intelligence source (not shown) to produce a varying frequency output oscillation over line 15 that is linearly proportional in frequency to the amplitude of the input signal. As is known to those skilled in this art, this FM signal is employed to further modulate an FM transmitter (not shown) for transmitting the intelligence signal to a remote location.

The VCO stage 10 comprises a pair of transistors 16 and 17 interconnected in mutual feedback to oscillate at a given center frequency in the absence of an input signal over line 14. The input signal over line 14 is applied to a resistance potential divider, comprised of resistors 19 and 20, and is thence directly coupled through resistors 21 and 22 directly to the base electrodes of transistors 16 and 17 to change the potentials at these electrodes and therefore vary the frequency of the oscillator. The base electrodes are biased by a D.C. potential on line 23 that is stabilized against variations in the supply voltage and, as will be seen, introduces a variable temperature compensation signal into the VCO, and this bias voltage is directly applied through resistors 48, 24, and 25. The collector electrodes of transistors 16 and 17 are independently energized by a D.C. potential over line 26 that is directly coupled to the collectors by resistors 27 and 28. A resistor 18 commonly couples the emitter electrodes of both transistors 16 and 17 to ground. Interconnecting the collector of each transistor in feedback with the base of the other transistor are the timing capacitors 30 and 31, and a resistor 29 directly interconnects the collector electrodes for the purpose of stabilizing the oscillator frequency against changes in the impedance of the input signal source (over line 14) as is described and claimed in the above mentioned patent.

For providing the voltage stabilized potentials on lines 23 and 26, the energizing source of D.C. potential applied on line 13 is initially directed through a voltage regulator stage 12 employing a regulating transistor 32, a pair of reversely poled diodes 33 and 34, operating in the Zener region, a resistor 35, and a diode 36. As shown, the regulating transistor 32 is interconnected in a common base configuration, with the Zener diodes 33 and 34 interconnecting the base of this transistor to ground, and with the resistor 35 interconnecting the base and collector electrodes of transistor 32. The D.C. supply voltage is applied to the collector electrode through the diode 36 which prevents the transmission of spurious negative pulses, and the voltage regulated D.C. output from this stage is taken between the emitter electrode and ground over line 37.

In operation of this stage 12, the Zener diodes 33 and 34 provide a regulated potential at the base of the transistor 32, and in the event that the input voltage rises, a voltage drop is produced across the resistor 35 in a direction to render the base electrode more negative with respect to the collector and accordingly reduce conductivity between the collector and the emitter electrodes, thereby maintaining the output voltage on line 37 substanially constant. Conversely, should the input voltage tend to decline, the voltage drop across the resistor 35 renders the base electrode less negative with respect to the collector and accordingly provides a greater conductivity between the collector and the emitter electrodes to again maintain a constant D.C. output voltage on line 37.

The ouput from voltage regulator stage 12 is applied to the temperature compensating stage 11 over line 37. In the temperature compensating stage, the D.C. potential on line 37 is applied to a potential divider comprising resistors 38, 39, and reversely poled diode 40 operating in the Zener region. The votlage drop across diode 40 therefore provides a further voltage stabilizing effect before application to the oscillator stage. This voltage across diode 40 is directly applied to energize the collector electrodes of the oscillator stage 10 through a diode 41, and over line 26 as described above.

When the VCO stage 10 as described is subjected to changes in temperature, undesired variations in its frequency occur due to temperature induced changes in the resistors, capacitors, and transistors. For example, in the hybrid circuit VCO configuration as described, the resistors in this circuit have negative temperature coefficients.

As a result of these temperature induced changes when all of the voltages applied to this circuit over lines 26, 23, and 14 are maintained constant, the frequency of this VCO stage undesirably increases with temperature in the manner shown by curve 60 in FIG. 2.

Referring to FIG. 2, it is seen that where the oscillator is designed for operation at an ambient temperature of 30° centigrade its center frequency is at a desired level 66 but at a low temperature of minus 20° centigrade, the oscillator frequency drops to a value far below this desired frequency. Similarly, as the temperature is increased to 80° centigrade, it is seen that the frequency of the oscillator is increased far above its desired center frequency 66.

In addition to this undesired change in frequency with temperature, the response to this VCO stage to the control volaget 14 (normally called the control sensitivity) also undesirably varies with change in temperature and this effect also must be compensated to enable the system to operate in the same manner over the complete temperature range experienced.

To compensate for these two changes in the circuit occurring as the temperature varies over the complete range of minus 20° centigrade to 80° centigrade, the temperature compensation stage 11 produces a positive coefficient correction voltage over line 26, that increases with temperature, to energize the collector electrodes of the transistors in the VCO stage, and produces two sequentially operating linear correction voltages over line 23 to vary the bias potential applied to the base electrodes.

The positive temperature coefficient signal (increase with temperature) applied to line 26 by this stage is for the purpose of correcting the control sensitivity of the circuit in response to control voltage 14, and this is provided by the voltage across Zener diode 40 that is connected to line 26 through diode 41. Since the Zener 40 has a positive temperature coefficient, it provides an approximate correction, as desired. The diode 41 may be used to obtain an even larger positive temperature coefficient change, if required.

To compensate for the nonlinear change in frequency over the complete range of minus 20° centigrade to 80° centigrade, the temperature compensation stage 11 also produces two sequentially operating linear corrections to vary the voltage applied over bias line 23. The first linear change operates over the range of temperatures extending from minus 20° centigrade to 30° centigrade, and the second linear correction operates over the temperature range of 30° centigrade to 80° centigrade. Since the nonlinear changes in the VCO stage can be approximated by linear changes in each of these ranges, the net effect of this dual range temperature compensation is to stabilize the frequency of the oscillator over the complete wide range of temperature exposure.

To provide the first linear correction over the first range of temperatures, the stage 11 includes a second potential divider consisting of resistors 42, 43, and 44, all in series with a plurality of forwardly poled diodes 45 and being interconnected between the power supply voltage line 37 and ground, as shown. A resistor 47 interconnects the junction 49 of the second voltage divider with the junction of Zener diode 40 and resistor 39 of the first potential divider.

By properly adjusting the value of any one of the resistances 44, 42 or 43, the voltage drop at junction 49 of the second voltage divider is made equal to the voltage drop across Zener diode 40 at the ambient temperature of 30° centigrade (or at the midpoint of the temperature range to be compensated). As will be seen this junction point 49 produces the desired compensation voltage that is applied over line 23 to bias the transistors in the VCO stage so as to stabilize the frequency over the complete temperature range.

The forwardly poled diodes 45 in the second potential divider have a negative temperature coefficient in opposition to that of the Zener diode 40 so that as the temperature falls below ambient, the voltage drop across these diodes tends to increase whereas the voltage drop across Zener diode 40 tends to decrease. As stated above, at the midrange temperature of 30° centigrade, the voltage at junction 49 is made the same as that across the Zener diode 40, and therefore provides the desired level of bias voltage on line 23 for energizing the base electrodes of the VCO transistors 16 and 17. Upon the temperature falling below this ambient level the voltage at junciton 49 rises due to the negative coefficient of the diodes 45 whereas the voltage across the Zener diode 40 falls because of the positive coefficient of this diode. Consequently, when the temperature falls below ambient, current flows from the junction 49 to the Zener diode 40 through resistor 47 lowering the potential at junction 49 to a desired preset level to properly bias line 23 at that temperature with the corrections needed. The value of resistor 47 is so adjusted that the current flow through this resistor at the lower end of the temperature range to be compensated (minus 20° centigrade in FIG. 2) is made just sufficient to adjust the potential at junction 49 to a desired level so as to raise the frequency of the oscillator stage to that existing at the ambient temperature of 30° centigrade. Thus this first linear correction applied in the range of minus 20° centigrade to plus 30° centigrade precisely adjusts the bias voltage produced at junction 49 at both the lower end of the temperature range and at the midrange point to maintain the oscillator frequency constant at both temperatures, and provides an approximately linear correction of the voltage at junction 49 in the range of temperatures between these two temperatures as is shown by curve 61 in FIG. 2. It is to be emphasized that it is not necessary to empirically design the second potential divider to provide a particular nonlinear variation with temperature but merely to employ a linear potentiometer and adjust its value to provide a proper potential at junction 49 at the lower end of the temperature range, since any nonlinear curve can be approximately by a straight line over a given range of its nonlinearity. Therefore it is only necessary to initially design and adjust the potential divider circuits so as to provide a given voltage at the junction 49 at ambient temperature 30°, and to adjust the value of resistor 47 at the lower temperature limit to provide the necessary linear correction between these two temperatures.

Since the nonlinear variation with temperature of the VCO stage is not the same in the second range of temperatures as in the first range, as the temperature range is increased above the ambient temperature of 30° centigrade, the correcting voltage at junction 49 would not be sufficient to stabilize the oscillator frequency at the desired level 66 and the frequency would normally fall as shown by the solid line portion of the curve 61 in FIG. 2 in the range of 30° to 80°.

To approve the necessary correction through this second temperature range, a second linear increment of current is applied to junction 49 over this second range of temperatures. The second linear correction is provided by means of a switching transistor 62 that interconnects an additional resistor 63 between the junction 49 and the power supply line 37 to raise the potential at junction 49 to the desired level in the second range and therefore restore the frequency of the VCO to level 66.

Referring again to FIG. 2, it is noted from curve 61 that in the second range of temperatures the frequency of the VCO would normally fall quite rapidly from the desired level 66 to a much lower frequency at the temperature of plus 80° centigrade. Consequently, by adding a second linear increment in a positive direction to the junction 49 over this range, the VCO frequency can be maintained very closely to the desired level as shown by the dotted curve 64 in FIG. 2.

For operating this switching circuit to apply the second linear correction, the base electrode of switching transistor 62 is energized by the potential at the junction of resistors 38 and 39 and the emitter is connected through resistor 63 to junction 49. It will be recalled that the potential at the junction of resistors 38 and 39 progressively increases as the temperature is raised due to the positive coefficient of the Zener diode 40 whereas the potential at junction 49 progressively decreases as the temperature increases due to the negative coefficient of the diodes 45.

Consequently by properly selecting or adjusting the values of resistors 38 and 39, the difference of potential between the base and the emitter junctions of transistor 62 can be made sufficiently great at a temperature just above the ambient temperature of 30° centigrade to render the transistor 62 conducting and apply an added current through transistor 62 and resistor 62 to the junction 49 to raise its potential. When the transistor 62 begins to conduct, current flows from the power supply lines 37 through this transistor and resistor 63 to the junction 49 thereby raising the potential at junction 49 to a desired level. The value of resistor 63 is so selected or adjusted that the current flow therethrough is just sufficient at the upper temperature limit of 80° centigrade to bring the potential at junction point 49 to a desired level and therefore to stabilize the oscillator frequency at the same frequency at 80° centigrade as it is stabilized at the ambient temperature of 30° centigrade, and also as it is stabilized at the low temperature minus 20° centigrade. Since the resistor 63 is linear and the transistor 62 merely functions as an on-off switch, the correction made to this stage in this upper range of temperature is linear and can be made to reasonably approximate the nonlinear variation over this range as shown by curve 64 in FIG. 2.

FIG. 2 illustrates this second correction applied to the circuit over the second temperature range. As shown, at a temperature slightly above the ambient temperature of 30° centigrade, the switching transistor 62 is turned on at point 65 to raise the potential at junction 49 and thereby increase the bias voltage and hence the frequency of the oscillator back to its normal desired level. As the temperature is further increased, this linear correction slightly overcompensates for the nonlinear changes occurring in the circuit but when the upper temperature of 80° centigrade is reached, the linear compensation has been preset by selection of the value of resistor 63 to just equal the changes in the circuit and fix the oscillator frequency at its desired center frequency.

Thus it is seen that in each of these two temperature ranges, a linear compensation is automatically and selectively added to the circuit to closely approximate the nonlinear variations occurring in the circuit.

It is believed evident to those skilled in the art at this point, that more than one switching circuit of the type described may be employed as needed to compensate for other nonlinear variations that may occur in other temperature ranges and that may involve nonlinear changes of the first, second, or even higher orders of nonlinearity. Each of the compensations being added in the different ranges is essentially linear and therefore can be adjusted to closely approximate a nonlinear change over the range involved. Where the nonlinearities that occur with temperature are greater, or the temperature induced changes being made occur more rapidly, more switching circuits will be needed to approximate the variations, whereas when the nonlinear changes occur more slowly, fewer of such linear switching circuits will be needed.

FIG. 3 illustrates a similar temperature compensating stage employing four sequentially applied linear corrections rather than two to provide compensation over a wider temperature range, or to provide more accurate and precise temperature compensation over the same range. As shown, for a first range of temperatures, a first linear correction is applied by means of the resistor 47 directly coupling the junction 49 to the Zener diode in the same manner as discussed above. For each of three other temperature ranges, a different switching transistor 71, 72, and 73 is selectively rendered conductive to progressively add an additional linear correction to junction 49 by passing an additional increment of current from the power supply line 37 to the junction 49. Thus in a first given temperature range above ambient, the transistor 73 is switched on and current is applied through resistor 74 adding to the increament of current already passing through resistor 47. Upon reaching the next higher range, the transistor 72 is also switched on to add an increment of current through resistor 74, and finally in the highest range the transistor 71 is switched on to add still a further increment of current through resistor 76 whereby all three transistors are conducting. If greater compensation is to be applied at temperature ranges below ambient, negative linear increments can be added to junction 49 in essentially the same manner as described to reduce the voltage at junction 49 at these lower temperature ranges.

FIG. 4 shows the use of diodes 78, 79, and 86 to perform the same switching functions as performed by the switching transistors in FIGS. 2 and 3. As shown the temperature compensation stage may be otherwise quite similar employing a first and second potential divider, as in the other embodiments, using switching means and resistors for coupling increments of current to and from the junction 49 of the second divider to stabilize the potential.

As the temperature rises, current flows through resistor 47 to raise the potential at junction 49 to provide a first increment of correction. As the temperature further increases to a second range and the potential differences between junction 49 and selected junctions of the first divider increases above that necessary to compel conduction through the diodes 78 and 79, these diodes are each rendered conductive at a different temperature to pass increments of current through their associated resistors 80 and 81 to junction 49 to maintain the potential at junction 49 at a proper potential for compensating the VCO in that range. To preset the switching voltages (for different temperatures) each of the diodes indicated at 78 and 79 may be one or a plurality of diodes interconnected in series.

To add a negative linear increment where needed, reversely poled diode switches, such as diode 86 shown, may be interconnected between junction 49 and suitable junctions on the first potential divider, such as the junction between resistors 84 and 85 to draw away increments of current from junction 49 and reduce the potential at this junction as needed should the VCO frequency tend to rise due to overcompensation from one of the positive increments. Again one or a plurality of series connected diodes at 86 may be employed to establish the temperature range at which this negative incremental correction is made.

It is believed evident to those skilled in the art that the temperature compensation system of the present invention may be employed in various ways to temperature compensate or temperature stabilize other circuits than that described and that various changes and modifications may be made without departing from the spirit and scope of this invention. Accordingly, this invention is to be considered as limited only by the following claims.

What is claimed is:

1. A voltage controlled oscillator circuit that is stabilized against temperature induced variations in frequency over multiple ranges of temperature comprising: a pair of transistors interconnected in feedback to oscillate, each transistor having base, collector, and emitter electrodes, and energizing means for applying potentials to said electrodes, said energizing means including a temperature compensating circuit means for automatically and cumulatively coupling a plurality of different additive increments of potential to said base electrodes for each range of temperature increase above a preset level, each increment being initially additively coupled at a different temperature, means for automatically subtracting an increment of potential from said base electrode at a temperature range below said preset level, and means for individually adjusting the level of each additive and subtractive increment.

2. In the circuit of claim 1, the addition of means for coupling said temperature compensating circuit means to the collector electrodes to stabilize the control sensitivity of the oscillator against temperature induced variations.

3. A multirange temperature compensation system for electronic circuits experiencing nonlinear changes with temperature comprising: automatically operating means responsive to the circuit experiencing a nonlinear change when exposed to temperature in a first range to apply a substantially linear increment of potential to the circuit to compensate for the temperature induced nonlinear change in that temperature range, second automatically operating means responsive to the circuit experiencing a different nonlinear change when exposed to a further change in temperatures in a second range and in the same direction as the first temperature range to cumulatively and additively apply a different substantially linear increment of potential of the same polarity to the circuit to correct for the different nonlinear change in the second range, and means for permitting individual adjustment of the level of each increment.

4. In the system of claim 3, said automatically operating means including a network having a temperature sensitive component, said network having a plurality of junctions at different potential levels that vary unidirectionally in response to temperature change and a single junction that varies in the opposite direction in response to temperature change, and means for automatically and progressively coupling each of said plurality of junctions to said single junction at different temperatures in a cumulatively additive manner as the temperature progressively changes unidirectionally to encompass said different temperature levels.

5. A temperature compensating system for an electronic circuit for automatically and incrementally providing compensation over plural ranges of temperatures comprising: a temperature sensitive variable reference network producing a plurality of different potentials, each varying unidirectionally with temperature change and an additional potential level varying in the opposite direction with temperature change, unidirectional conducting means interconnecting some of said plurality of different potentials with the additional potential level for connection therebetween, and impedance means connecting other of said plurality of potentials with said additional potential, said unidirectional conducting means each automatically responsive to the difference between its associated potential level and said additional potential level reaching a preset value to additively pass an increment of current therebetween, and means providing individual adjustment of said current increments.

6. In the temperature compensation system of claim 5, said temperature sensitive variable reference network comprising a first and second voltage divider circuit each having a temperature sensitive impedance, a plurality of junctions in said first voltage divider circuit for providing said plurality of different potentials varying unidirectionally with temperature and a single junction in the second potential divider circuit whose potential varies with temperature in the opposite direction, said conducting means coupling some of said plurality of junctions in the first voltage divider circuit with said single junction in the second voltage divider circuit, said impedance means coupling another one of said plurality of junctions in the first potential divider circuit with said single junction in the second potential divider circuit, and means for individually adjusting the level of current passed by said conducting means and said impedance means.

References Cited

UNITED STATES PATENTS 3,054,966 9/1962 Etherington ------ 131—176 X

ROY LAKE, *Primary Examiner.*

S. H. GRIMM, *Assistant Examiner.*